E. A. THISSELL.
Kettle-Lifters.
No. 141,020.             Patented July 22, 1873.
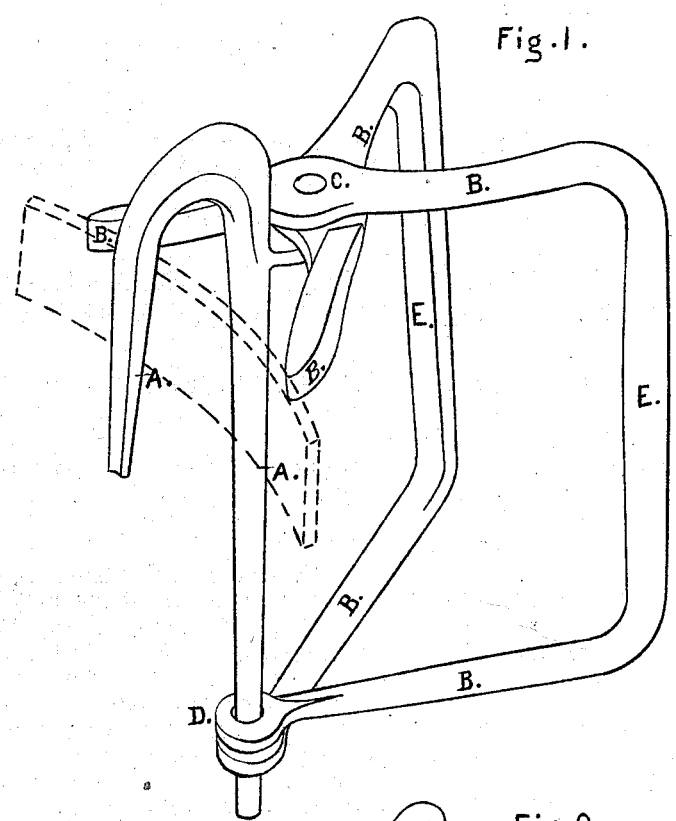
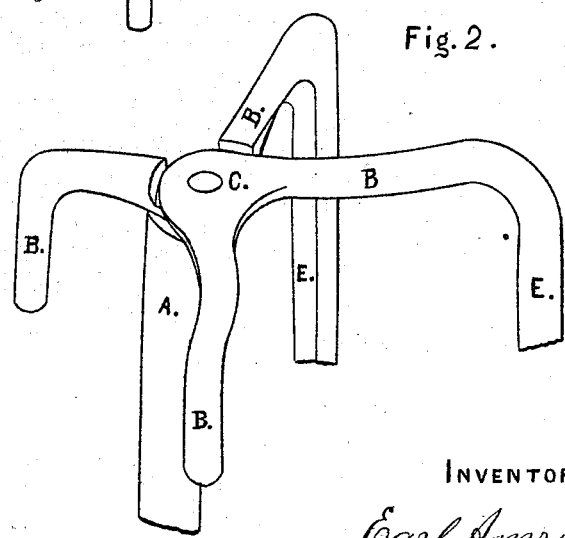
Witnesses.
Nathaniel Hill,
Edwin Lamson
Inventor.
Earl Amri Thissell

UNITED STATES PATENT OFFICE.

EARL AMRI THISSELL, OF LOWELL, MASSACHUSETTS, ASSIGNOR OF ONE-HALF HIS RIGHT TO JOSEPH CHURCHILL, OF SAME PLACE.

IMPROVEMENT IN KETTLE-LIFTERS.

Specification forming part of Letters Patent No. 141,020, dated July 22, 1873; application filed September 23, 1872.

*To all whom it may concern:*

Be it known that I, EARL AMRI THISSELL, of Lowell, in the county of Middlesex and the State of Massachusetts, have invented an Improved Kettle-Lifter, of which the following is a specification:

My invention relates to an improved kettle-lifter; and consists of two pivoted levers, and a support against which the kettle is pressed by the levers in a manner to be firmly held when desired.

Figure 1 is a perspective view of a kettle-lifter embodying my invention. Fig. 2 is a perspective view of a portion of a kettle-lifter also embodying my invention.

A, Fig. 1, is the support, to which the levers B B are pivoted at C, and on which they swing at D, forming handles at E E. The hooked support is placed over the rim of the kettle, as indicated in the drawing, and the levers brought against the outside of the kettle by closing the hand about the handles when the dish is pressed against the support and firmly held, so that it may be lifted or canted to permit its contents to be poured from it; and the position of the handles is such that the hand, in the operation of pouring, is free from danger of scalding by rising steam from the kettle or vessel.

In Fig. 2 the levers are so formed as to permit them to be pressed against the inner surface of the vessel, the support being on the outside of the vessel.

I claim—

The combination of the pivoted levers B B and the support A, substantially as described.

EARL AMRI THISSELL.

Witnesses:
EDWIN LAMSON,
NATHANIEL HILL.